US012676062B2

(12) United States Patent
Gopalasamy et al.

(10) Patent No.: US 12,676,062 B2
(45) Date of Patent: Jul. 7, 2026

(54) DEVICE, METHOD AND SYSTEM FOR CONTROLLING ALERT TRANSMISSION

(71) Applicant: MOTOROLA SOLUTIONS, INC., Chicago, IL (US)

(72) Inventors: Logesvary Poo Gopalasamy, Sungai Petani (MY); Chon Hong Ser Toh, Simpang Ampat (MY); Chun Wen Ooi, Georgetown (MY); Yoke May Ling, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 23 days.

(21) Appl. No.: 18/961,619

(22) Filed: Nov. 27, 2024

(65) Prior Publication Data

US 2026/0148630 A1 May 28, 2026

(51) Int. Cl.

| | |
|---|---|
| *G08B 25/00* | (2006.01) |
| *G06V 20/52* | (2022.01) |
| *G08B 13/196* | (2006.01) |
| *G08B 21/02* | (2006.01) |
| *G08B 21/18* | (2006.01) |
| *G08B 25/01* | (2006.01) |

(52) U.S. Cl.
CPC .......... *G08B 25/009* (2013.01); *G06V 20/52* (2022.01); *G08B 13/19613* (2013.01); *G08B 21/02* (2013.01); *G08B 21/182* (2013.01); *G08B 25/016* (2013.01)

(58) Field of Classification Search
CPC ........ G06V 20/35; G06V 20/44; G06V 20/47;

G06V 20/52; G08B 13/19608; G08B 13/19621; G08B 13/19613; G08B 25/009; G08B 21/02; G08B 21/182; G08B 25/016
See application file for complete search history.

(56) References Cited

U.S. PATENT DOCUMENTS

| | | | | |
|---|---|---|---|---|
| 6,791,451 | B1 * | 9/2004 | Muise .................... | G08B 25/10 |
| | | | | 42/70.11 |
| 7,200,965 | B2 * | 4/2007 | Vor Keller .............. | F41A 17/04 |
| | | | | 224/244 |
| 9,307,317 | B2 * | 4/2016 | Chang ..................... | G06F 21/79 |
| 9,432,639 | B2 | 8/2016 | Oh et al. | |
| 9,564,043 | B2 * | 2/2017 | Sanders ................ | F41C 33/029 |
| 10,460,590 | B2 * | 10/2019 | Strack .................. | G08B 27/001 |
| 10,540,549 | B2 | 1/2020 | Zhao et al. | |
| 11,069,225 | B1 * | 7/2021 | Chiam ............. | G08B 13/19613 |
| 11,380,099 | B2 | 7/2022 | Wilkosz et al. | |
| 12,010,464 | B2 * | 6/2024 | Guzik ..................... | H04W 4/38 |

(Continued)

*Primary Examiner* — John A Tweel, Jr.
(74) *Attorney, Agent, or Firm* — PERRY + CURRIER INC. (FOR MSI)

(57) ABSTRACT

A communication device receives one or more of audio and images associated with a first responder, for example from one or more of a microphone and a camera. The communication analyzes one or more of the audio and the images to determine that the first responder has removed one or more body worn objects (BWOs) as demanded by a person-of-interest (POI), and determines a severity level of removal of the one or more BWOs. The communication device transmits, to one or more other communication devices, an alert indicating one or more of the removal of the one or more BWOs and the severity level, and controls the transmitting of the alert based on the severity level.

20 Claims, 5 Drawing Sheets

"Put your hands up and remove all your weapons, radios and your body worn camera! Or else I will trigger a bomb!"

(56)        References Cited

U.S. PATENT DOCUMENTS

2001/0019071 A1*   9/2001   Vor Keller ............ F41C 33/029
                                                          224/244
2017/0059265 A1*   3/2017   Winter ..................... H04N 5/91
2017/0173832 A1*   6/2017   Janisse ................... B29C 37/02

* cited by examiner

"Put your hands up and remove all your weapons, radios and your body worn camera! Or else I will trigger a bomb!"

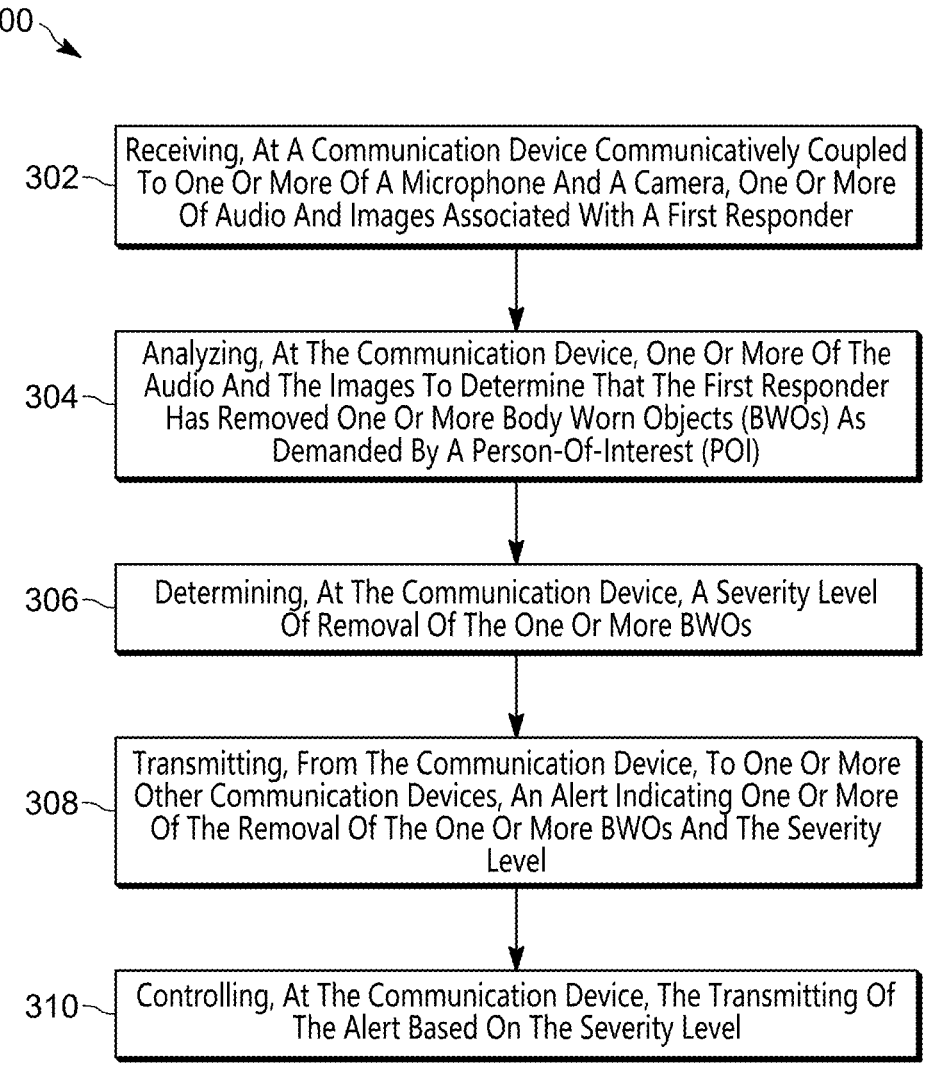

300

302 — Receiving, At A Communication Device Communicatively Coupled To One Or More Of A Microphone And A Camera, One Or More Of Audio And Images Associated With A First Responder 304 — Analyzing, At The Communication Device, One Or More Of The Audio And The Images To Determine That The First Responder Has Removed One Or More Body Worn Objects (BWOs) As Demanded By A Person-Of-Interest (POI)

306 — Determining, At The Communication Device, A Severity Level Of Removal Of The One Or More BWOs 308 — Transmitting, From The Communication Device, To One Or More Other Communication Devices, An Alert Indicating One Or More Of The Removal Of The One Or More BWOs And The Severity Level 310 — Controlling, At The Communication Device, The Transmitting Of The Alert Based On The Severity Level

FIG. 3

DEVICE, METHOD AND SYSTEM FOR CONTROLLING ALERT TRANSMISSION

BACKGROUND

In certain high-risk situations, police officers may be overpowered by criminals. Such scenarios may occur when a criminal points a weapon at the officer, and the like. An overpowered officer may be subjected to coercive verbal demands from the criminal. These demands may include instructing the officer to remove body-worn cameras (e.g., to avoid recording), radios (e.g., to prevent communication), weapons, and the like. Compliance with such demands by an officer may be impossible to ignore, and may put the officer in danger. A system that includes a communication device, such as an officer radio, suffers from a technical problem of providing alerts of the incident without officer, or other human, intervention.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 3 is a flowchart of a method for controlling alert transmission, in accordance with some examples.

Figure 1:
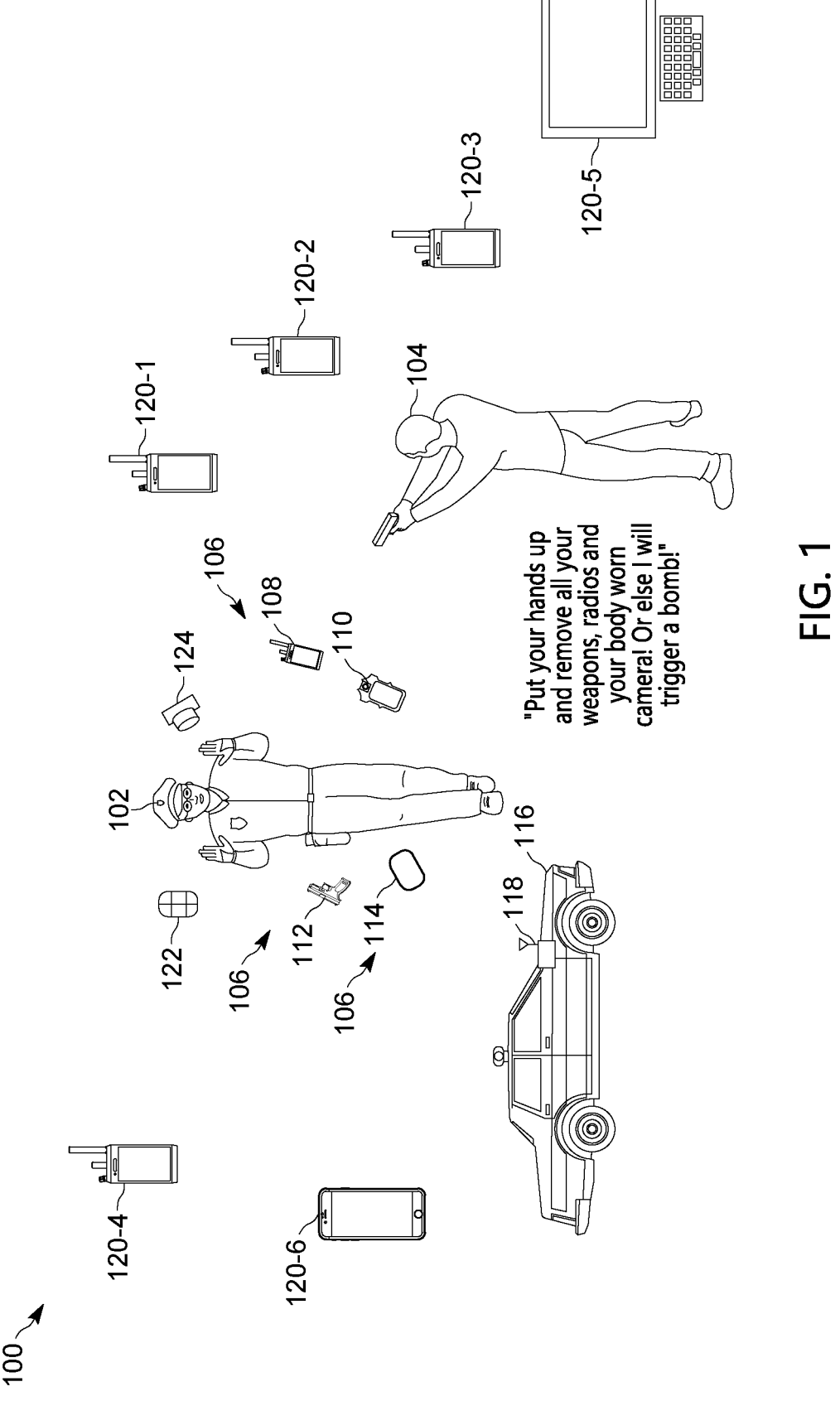
FIG. 1 is a system for controlling alert transmission, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

A significant technical challenge arises in ensuring that a communication device, such as a police officer's radio, or an associated radio, can autonomously generate alerts during high-risk situations without requiring direct human intervention. Furthermore, such autonomous generation of alerts, if performed indiscriminately, may waste bandwidth and/or processing resources. For example, police officers, when overpowered by criminals, may be subjected to coercive demands that compromise their safety and obstruct law enforcement operations. Such scenarios may include instances where a criminal issues verbal commands instructing the officer to remove essential equipment like body-worn cameras, radios, or weapons. Compliance with these commands, often unavoidable, further places the officer in jeopardy. However, if an alert were transmitted merely in response to an accelerometer indicating an associated device has been removed, erroneous alerts may be transmitted (e.g., the officer may have dropped the device, and is not being coerced to do so), which is a waste of bandwidth and furthermore may cause personnel to be dispatched erroneously. Consequently, the lack of an automated alerting mechanism under the above mentioned conditions is a critical technological problem. Thus, there exists a need for an improved technical method, device, and system for controlling alert transmission.

An aspect of the present specification provides a method comprising: receiving, at a communication device communicatively coupled to one or more of a microphone and a camera, one or more of audio and images associated with a first responder; analyzing, at the communication device, one or more of the audio and the images to determine that the first responder has removed one or more body worn objects (BWOs) as demanded by a person-of-interest (POI); determining, at the communication device, a severity level of removal of the one or more BWOs; transmitting, from the communication device, to one or more other communication devices, an alert indicating one or more of the removal of the one or more BWOs and the severity level; and controlling, at the communication device, the transmitting of the alert based on the severity level.

Another aspect of the present specification provides a communication device comprising: a controller communicatively coupled to one or more of a microphone and a camera; and a computer-readable storage medium having stored thereon program instructions that, when executed by the controller, causes the controller to perform a set of operations comprising: receiving one or more of audio and images associated with a first responder; analyzing one or more of the audio and the images to determine that the first responder has removed one or more body worn objects (BWOs) as demanded by a person-of-interest (POI); determining a severity level of removal of the one or more BWOs; transmitting, from the communication device, to one or more other communication devices, an alert indicating one or more of the removal of the one or more BWOs and the severity level; and controlling the transmitting of the alert based on the severity level.

Each of the above-mentioned embodiments will be discussed in more detail below, starting with example system and device architectures of the system in which the embodiments may be practiced, followed by an illustration of processing blocks for achieving an improved technical method, device, and system for controlling alert transmission.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions and/or program code and/or computer program code. These computer program instructions and/or program code may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions and/or program code may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions and/or program code may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for controlling alert transmission. The various components of the system 100 may be in communication via any suitable combination of wired and/or wireless communication links. While for simplicity communication links between components of the system in 100 are not depicted in FIG. 1, such communication links may include any suitable combination of wireless and/or wired links and/or wireless and/or wired communication networks, and the like. It is further understood that, in some instances, communication links may be shown between certain components as double-ended arrows therebetween, as in FIG. 2, FIG. 4 and FIG. 5.

As depicted in FIG. 1, a first responder 102 (e.g., a police officer) is being held at gunpoint by a person-of-interest (POI) 104, who is holding a gun on the first responder 102 and demanding that the first responder 102 "Put your hands up and remove all your weapons and radios and your body worn camera! Or else I will trigger a bomb!", and the like. Whether or not the POI 104 may be able to trigger a bomb, the first responder 102 may be concerned about public safety and, as depicted, may remove various body worn objects (BWOs) 106, that may include, but is not limited to a communication device 108, a body worn camera (BWC) 110, a gun 112 (e.g., or any other suitable weapon), and an access card 114. For example, the access card 114 may be for a building that the first responder 102 has been authorized to enter on patrol.

For simplicity, the communication device 108, the BWC 110, the gun 112, and the access card 114 are collectively referred to as the BWOs 106, though the BWOs 106 removed by the first responder 102 may comprise one or more of any suitable BWOs 106, and may include, but are not limited to, any suitable weapon, and like, amongst other possibilities.

Furthermore, as depicted, the BWOs 106 are depicted as being removed and discarded by the first responder 102. As such, it is understood that FIG. 1 depicts a state of the system 100 after the first responder 102 has followed the demands of the POI 104.

As depicted, the system 100 further includes a vehicle 116 equipped with a communication device 118, such as in-dash radio, and the like. As depicted, the vehicle 116 comprise a police vehicle that the first responder 102 (e.g., a police officer), may have used to arrive at the location of the POI 104. As such, the communication device 118 may be proximal to the first responder 102 (e.g., within 5 meters, within 10 meters, within 20 meters, amongst other possibilities, and the like such that the communication device 118 may communicate with the communication device 108 and/or the BWC 110). The vehicle 116 and the communication device 118 may, however, be optional.

While the first responder 102 is depicted as a police officer, the first responder 102 may comprise any suitable first responder, such as other types of first responders that may include, but are not limited to, firefighters, emergency medical technicians, security guards, amongst other possibilities, and the like, with the vehicle 116 adapted accordingly.

As depicted, the system 100 further comprises a plurality of other communication devices 120-1, 120-2, 120-3, 120-4, 120-5, 120-6 (e.g., interchangeably referred to, collectively, as the other communication devices 120 and, generically, as an other communication device 120). While only six other communication devices 120 are depicted, the system 100 may comprise as few as one other communication device 120, or any other suitable number of other communication devices 120.

Furthermore, one or more (or all) of the other communication devices 120-1, 120-2, 120-3, 120-4 may be a same type of communication device as the communication device 108 removed by the first responder 102, and/or one or more (or all) of the other communication devices 120-1, 120-2, 120-3, 120-4 may be a different type of communication device as the communication device 108 removed by the first responder 102. Furthermore, while not depicted for simplicity, the other communication devices 120-1, 120-2, 120-3, 120-4 may be operated by respective first responders who may be of a same, or different, type of first responder as the first responder 102. For example, one or more (or all) of the other communication devices 120-1, 120-2, 120-3, 120-4 may be operated by other police officers, and/or one or more (or all) of the other communication devices 120-1, 120-2, 120-3, 120-4 may be operated by other types of first responders.

Indeed, as depicted, other communication devices 120-1, 120-2, 120-3, 120-4 comprise radios used by first responders, and may use talkgroups, push-to-talk (PTT), and the like to communicate therebetween.

In contrast, the other communication device 120-5 comprises a terminal (e.g., a dispatch terminal) that may be operated by a dispatcher (not depicted), and the terminal may be used to dispatch first responders to incidents, such as an incident represented by the POI 104 holding a gun on the first responder 102. The other communication device 120-5 may be a component of a Public-Safety Answering Point (PSAP) and/or dispatch center.

Hence, it is understood that the other communication devices 120-1, 120-2, 120-3, 120-4, 120-5 may be associated with a police department that dispatched the first responder 102 and/or all the communication devices 108, 118, 120-1, 120-2, 120-3, 120-4, 120-5 may be associated with a same police department and/or first responder (and/or public service) entity. However, all the communication devices 108, 118, 120-1, 120-2, 120-3, 120-4, 120-5 may be associated with first responder (and/or public service) entities that may be the same, or different, as the police department that dispatched the first responder 102.

In further contrast, as depicted, the other communication device 120-6 comprises a cell phone, and the like, that may be operated by a civilian (not depicted) that manages, and/or resides at, and/or is visiting, and/or is otherwise associated with, the building to which the access card 114 provides access.

In general, it is understood that network addresses of the other communication devices 120 may be registered with the communication device 108 and/or the communication device 118, and/or network addresses of the communication device 120 may be registered with a cloud computing device (e.g., that may be a component of a PSAP and/or dispatch center, for example of which the other communication device 1120-5 is a component), such that the communication device 108 and/or the communication device 118 has access to such network addresses. Such network addresses may include, but are not limited to, email addresses, phone numbers, or other types of network addresses that may be used to communicate with, and/or send alerts to, the other communication devices 120, including, but not limited to, communications and/or alerts provided on talkgroups (e.g., in the case of the other communication devices 120-1, 120-2, 120-3, 120-4, 120-5).

It is understood that the system 100 further comprises one or more of a microphone 122 and a camera 124. Furthermore, while not depicted in FIG. 1 (e.g., see FIG. 2), the microphone 122 and the camera 124 are communicatively coupled to the communication device 108 and/or the vehicle communication device 118 (e.g., see FIG. 2), and/or any suitable communication device of the system 100. In some examples, one or more of the microphone 122 and the camera 124 may be integrated with the communication device 108 and/or the vehicle communication device 118, and in other examples, one or more of the microphone 122 and the camera 124 may be components of the BWC 110, but in communication with one or more of the communication devices 108, 118. Indeed, the communication device 108 and/or the communication device 118 (e.g., when present), may form a personal area network (PAN), and the like, with the BWC 110, and with one of the communication devices 108, 118 acting as a communication hub of the PAN (e.g., via which other components of the PAN communicate with other components of the system 100).

In yet further examples, the microphone 122 and/or the camera 124 may be components of a closed circuit microphone and/or camera to which a communication device 108, 118 (and/or a cloud computing device) has been provided access.

As depicted, the microphone 122 and the camera 124 are located to at least acquire and/or at least partially acquire, respectively, audio and images associated with the first responder 102 and, in particular, sound and/or images that may indicate the first responder 102 has removed one or more BWOs 106 as demanded by the POI 104. For example, the microphone 122 may acquire the audio of the POI 104 saying "Put your hands up and remove all your weapons and radios and your body worn camera! Or else I will trigger a bomb!", and the camera 124 may acquire images that may include images of the BWOs 106 being removed by the first responder 102.

When the camera 124 is a component of the communication device 108 and/or the BWC 110, images acquired by the camera 124 that indicates one or more of the BWOs 106 being removed by the first responder 102 may show images indicating the communication device 108 and/or the BWC 110 is falling and/or being placed on the ground, which may result in the camera 124 facing upwards to capture other BWOs 106 being removed by the first responder 102.

When the camera 124 is a component of the communication device 118 of the vehicle 116, images acquired by the camera 124 may show the one or more of the BWOs 106 being removed by the first responder 102.

Regardless of the location of the microphone 122, audio captured by the microphone 122 may comprise words spoken by the first responder 102 describing removing of the BWOs 106, such as "I am now removing my radio, I am now removing my body worn camera, I am now carefully placing my gun on ground, and finally I am placing this access card on the ground".

Alternatively, or in addition, audio captured by the microphone 122 may comprise words spoken by the POI 104 describing removing of the BWOs 106, such as "Good, you've now placed your radio on the ground, and also place your body worn camera on the ground. Good. Now carefully remove your gun from your holster and put it on the ground. Good. Now kick it towards me. What's that on your belt? An access card? I dunno what that's for, but please put it on the ground too. Good.".

Indeed, any suitable combination of audio and/or images from the microphone 122 and/or the camera 124 that indicate that the first responder 102 has removed one or more BWOs 106 as demanded by the POI 104 is within the scope of the present specification.

Furthermore, images from the camera 124 may comprise video and/or a series of images acquired periodically (e.g., every half second, every second, every 2 seconds, amongst other possibilities).

In general, the audio and/or the images are received at a communication device 108, 118 and analyzed to determine that the first responder 102 has removed one or more BWOs 106 as demanded by the POI 104. Furthermore, the communication device 108, 118 that receives the audio and/or the images determines a severity level of the removal of the one or more BWOs 106, which may, for example, be provided in form of a numerical score (e.g., a risk score), with higher scores indicating higher severity levels, and lower scores indicating lower severity levels. It is further understood that the processes described herein may be distributed among two or more communication devices, such as the communication devices 108, 118. It is further understood that, in some examples, the processes described herein may be performed by a cloud computing device (not depicted) with which the communication devices 108, 118, and/or the microphone 122 and camera 124 are in communication.

The communication device 108, 118 transmits to one or more of the other communication devices 120 an alert indicating one or more of the removal of the one or more BWOs 106 and the severity level, for example to indicate to the one or more other communication devices 120 that the first responder 102 has removed one or more BWOs 106 as demanded by the POI 104 and a determined severity level of such removal.

While the term "severity" is understood to be a relative term, the term "severity level" is understood to include data that provides an indication of such severity, for example on any suitable scale, and may include a numerical score, with higher scores indicating higher severity levels, and lower scores indicating lower severity levels. Hence, the term severity level is understood to define an objective technological determination of severity by a communication device 108, 118.

For example, as described herein, a memory (e.g., described herein with respect to FIG. 2) accessible to a communication device 108, 118 may store a list of respective severity levels assigned to each of the one or more BWOs 106, and as the audio and/or video indicates that a BWO 106 has been removed, the communication device 108, 118 may combine (e.g., add) the respective severity levels of the BWOs 106 that are removed to generate the severity level. Indeed, the communication device 108, 118 may monitor the number of BWOs 106 that are removed via one or more of the audio and the video, and, as the number of the one or more BWOs that are removed increases, increasing the severity level. An example of such a list is described herein with respect to FIG. 2.

Put another way, the severity level may be determined using a running tally of respective severity levels of the BWOs 106 and adding such severity levels together.

However, the severity level may be determined in any suitable manner and may, for example, be normalized to a scale of 0 to 1, or 0 to 10, or 0 to 100, and the like (e.g., with "0" being a lowest severity level and "1", or "10", or "100" being a highest severity level).

Furthermore, a communication device 108, 118 controls the transmitting of the alert based on the severity level. Such controlling may be threshold based, depending on the scale of the severity level.

For example, controlling the transmitting of the alert based on the severity level may comprise: selecting a larger number of the one or more other communication devices 120 to which the alert is transmitted based on a value of the severity level being above a threshold value.

For example, when the severity level is on a particular scale having a maximum value of "M", a threshold value may be 20%, and the like, of the maximum value, and when the severity level is below the threshold value, only other communication devices 120 associated with the communication device 108, 118 may receive the alert. For example, such other communication devices 120 associated with the communication device 108, 118 may comprise a subset of the other communication devices 120-1 . . . 120-5 operated by other first responders on patrol in a same patrol area as the first responder 102. Indeed, in this example, when the severity level is below the threshold value, a subset of the other communication devices 120-1 . . . 120-5 associated with the police department that dispatched the first responder 102, that is less than the total number of the other communication devices 120-1 . . . 120-5, may receive the alert.

However, when the severity level is above the threshold value, all other communication devices 120 associated with the police department that dispatched the first responder 102 may receive the alert, such as the other communication devices 120-1 . . . 120-5.

However, any suitable threshold value, or combination thereof, is within the scope of the present specification, and may be based on severity levels of the various BWOs 106 on a list of BWOs 106 and their respective severity levels, as described herein.

Figure 2:
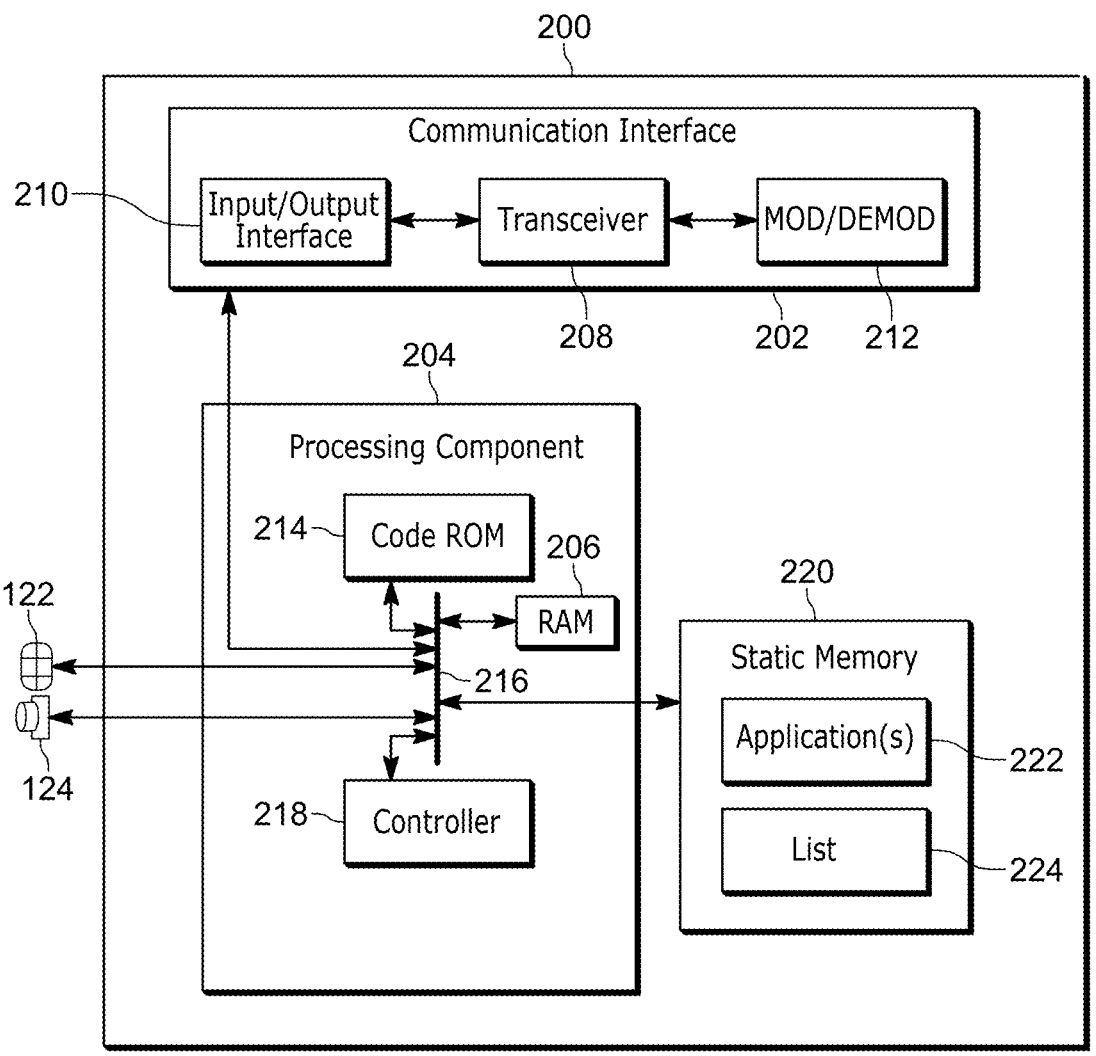
FIG. 2 is a device diagram showing a device structure of a device for controlling alert transmission, in accordance with some examples.

Attention is next directed to FIG. 2, which depicts a schematic block diagram of an example communication device 200, which may comprise the communication device 108, 118, and/or a cloud computing device, that implements functionality as described herein with respect to FIG. 3. However, the communication device 200 may alternatively comprise any suitable BWO 106, and/or combination thereof, such as the BWC 110, which may implement, or at least partially implement the functionality as described herein. Hence, while the communication device 200 is depicted in FIG. 2 as a single component, the communication device 200 may be distributed among a plurality of components such as the communication devices 108, 118 the BWC 110, and/or a cloud computing device.

As shown in FIG. 2, the communication device 200 includes a communication interface 202 communicatively coupled to the common data and address bus 216 of the processing component 204. The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

As depicted, the memory 220 further stores a list 224 of respective severity levels assigned to each of the one or more BWOs 106. Table I, described hereafter provides an example of the list 224.

TABLE I

| (LIST 224) | |
|---|---|
| BODY WORN OBJECT (BWO) | SEVERITY LEVEL |
| GUN | 10 |
| ELECTRIC GUN | 9 |
| BULLETPROOF VEST | 8 |
| RADIO | 8 |
| POLICE CAR KEY | 7 |
| ACCESS CARD | 7 |
| BODY WORN CAMERA | 6 |
| REMOTE SPEAKER MICROPHONE | 6 |
| SMART GLASSES | 5 |
| SMART WATCH | 5 |
| SMART WRISTBAND | 5 |
| HANDCUFFS | 4 |
| PERSONAL PHONE | 3 |
| FLASHLIGHT | 2 |
| WHISTLE | 1 |

For example, Table I includes a list of a plurality of BWOs 106 including, in a first column, a gun, an electric gun, a bulletproof vest, a radio, a police car key, an access card (e.g., for a building or a police station), a body worn camera, a remote speaker microphone (that may or may not be video enabled), smart glasses, a smart watch, a smart wristband, handcuffs, a personal phone, a flashlight, a whistle. Furthermore, a second column list associated severity levels of the BWOs 106 in the first column, with a gun assigned a severity level of "10", and electric gun (e.g., a taser), assigned a severity level of "9", etc.

As depicted, the communication device 200 is communicatively coupled to the microphone 122 and the camera 124 via the common data and address bus 216. While as depicted the microphone 122 and the camera 124 are external to the communication device 200, one or more of the microphone 122 and the camera 124 may be internal to, and/or integrated with, the communication device 200.

While not depicted, the communication device 200 may include, and/or be communicatively coupled to, any suitable combination of input devices and/or output devices, which may include the microphone 122 and/or the camera 124, a speaker, a display screen, a keyboard, a pointing device, and the like.

The communication interface 202 may include one or more wired and/or wireless input/output (I/O) interfaces 210 that are configurable to communicate with other suitable components of the system 100.

For example, the communication interface 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100, including, but not limited to, the other communication devices 120. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

It is understood that while DMR transceivers, P25 transceivers, and TETRA transceivers may be particular to first responders, in some examples, the system 100 may be operated by a first responder entity (e.g., such as a police department, a fire department, an emergency medical services department, and the like), and hence such transceivers may be used for communications.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

It is furthermore understood that when the communication interface 202 may include a plurality of transceivers 208, the communication device 200 may select which of the plurality of transceivers 208 to use based on the aforementioned severity level.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the communication device 200 is not a generic controller and/or a generic device, but a device specifically configured to implement functionality for controlling alert transmission. For example, in some examples, the communication device 200 and/or the controller 218 specifically comprises a computer executable engine configured to implement functionality for controlling alert transmission.

The static memory 220 comprises a non-transitory machine readable medium that stores machine readable instructions to implement one or more programs or applications and/or program code. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the communication device 200 as described herein are maintained, persistently, at the memory 220 and used by the controller 218, which makes appropriate utilization of volatile storage during the execution of such programming instructions.

In particular, the memory 220 stores instructions and/or program code and/or a set of instructions corresponding to the at least one application 222 that, when executed by the controller 218, enables the controller 218 to implement functionality for controlling alert transmission, including but not limited to, the blocks of the method set forth in FIG. 3.

Put another way, the memory 220 may comprise a (e.g., non-transitory) computer-readable storage medium having stored thereon program instructions that, when executed by the controller 218, cause the controller 218 to perform a set of operations comprising the blocks of the method set forth in FIG. 3

The application 222 may include programmatic algorithms, and the like, to implement functionality as described herein. Alternatively, and/or in addition to programmatic algorithms, the application 222 may include one or more machine learning algorithms to implement functionality as described herein. In particular, such programmatic algorithms and/or machine learning algorithms may be used to determine a severity level and/or to select a set of other communication devices to which to transmit an alert based on the severity level.

For example, the one or more machine learning algorithms may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

When one or more machine learning algorithm are used to implement such functionality, the one or more machine learning algorithm may be trained to determine a severity level and/or to select a set of other communication devices to which to transmit an alert based on the severity level, for example, by appropriate (positive and/or negative) training data that may be manually generated, or generated by a training data generation computing device.

For example, positive training data for determining a severity level may include positive training input comprising lists of different combinations of BWOs that may be removed by a first responder when demanded by a POI, and positive training output may comprise associated assigned severity scores. Such associated assigned severity scores may be manually assigned, or may be assigned using a programmatic algorithm, and the like. Similarly, negative training data for determining a severity level may include negative training input comprising lists of different combinations of BWOs that may be removed by a first responder when demanded by a POI, and negative training output may comprise associated assigned severity scores that may be incorrect. Such incorrect associated assigned severity scores may be manually assigned, or may be assigned using a programmatic algorithm, and the like.

Similarly, positive training data for selecting a set of other communication devices to which to transmit an alert based on the severity level may include positive training input comprising different severity levels, and positive training output may comprise associated combinations of other communication devices. Such associated combinations of other communication devices may be manually selected, or may be selected using a programmatic algorithm, and the like. In some of these examples, associated lists of the BWOs that led to associated severity scores may also be provided as positive training input as, in some cases, a respective type of one or more of the BWOs may affect the associated combinations of other communication devices that are selected. For example, when an access card is one of the BWOs, and the access card is for a building patrolled by a first responder that discarded the access card, then a civilian cell phone (e.g., the other communication device 120-6), may be one of the other communication devices that are selected.

Similarly, negative training data for selecting a set of other communication devices to which to transmit an alert based on the severity level may include negative training input comprising different severity levels, and negative training output may comprise incorrect associated combinations of other communication devices. Such incorrect associated combinations of other communication devices may be manually selected, or may be selected using a programmatic algorithm, and the like. In some of these examples, associated lists of the BWOs that led to associated severity scores may also be provided as negative training input as described above.

While details of the other communication devices 120 are not described herein, the other communication devices 120 may have a structure similar to that depicted in FIG. 2, but adapted for respective functionality thereof. For example, a dispatch terminal (e.g., the other communication device 120-5) and/or a civilian cell phone (e.g., the other communication device 120-6) may include components (e.g., including, but not limited to, respective transceivers) particular for implementing their respective functionality. For example, a dispatch terminal may include a headset, and a physical keyboard and mouse, and a civilian cell phone may include transceivers particular to civilian bandwidths (and exclude transceivers particular to first responder bandwidths, such as P25 transceivers, and the like)

Attention is now directed to FIG. 3, which depicts a flowchart representative of a method 300 for controlling alert transmission. The operations of the method 300 of FIG. 3 correspond to machine readable instructions that are executed by the controller 218 and/or the communication device 200. In the illustrated example, the instructions represented by the blocks of FIG. 3 are stored at the memory 220 for example, as the application 222. The method 300 of FIG. 3 is one way in which the controller 218 and/or the communication device 200 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps". The method 300 of FIG. 3 may be implemented on variations of the system 100 of FIG. 1, as well.

It is furthermore understood in the description of the method 300, that the communication device 200 may comprise one or more of the BWOs 106, such as one or more of the communication device 108 and/or the BWC 110. Alternatively, or in addition, the communication device 200 may comprise a device proximal to the first responder 102, such as the vehicle communication device 118.

At a block 302, the controller 218, and/or the communication device 200, receives, from one or more of the microphone 122 and the camera 124, one or more of audio and images associated with the first responder 102.

At a block 304, the controller 218, and/or the communication device 200, analyzes one or more of the audio and the images to determine that the first responder 102 has removed one or more BWOs 106 as demanded by the POI 104.

At a block 306, the controller 218, and/or the communication device 200, determines a severity level of removal of the one or more BWOs 106.

For example, determining the severity level of the removal of the one or more BWOs 106 may comprise: accessing, at the memory 220, the list 224 of respective severity levels assigned to each of the one or more BWOs 106; and when a number of the one or more BWOs 106 that are removed is two or more, combining the respective severity levels of the two or more BWOs 106 that are removed to generate the severity level. In such examples, method 300 may further comprise the controller 218, and/or the communication device 200: monitoring the number of the one or more BWOs 106 that are removed via one or more of the audio and the images; and as the number of the one or more BWOs 106 that are removed increases, increasing the severity level.

For example, referring to Table I and FIG. 1, the first responder 102 may remove, in order, the communication device 108 (e.g., a radio) with a severity level of "8", the body worn camera 110 with a severity level of "6", the gun 112 with a severity level of "10", and the access card 114 with a severity level of "7". The controller 218, and/or the communication device 200 will add the various severity levels together as the BWOs 106 are removed, and determine running severity levels of: "8" (e.g., when the communication device 108 is removed), "14" (e.g., "6" added to "8" when the body worn camera 110 is removed), "24" (e.g., "10" added to "14" when the gun 112 is removed), and "31" (e.g., "7" added to "24" when the access card 114 is removed). The total severity level determined in this example is hence "31".

At a block 308, the controller 218, and/or the communication device 200, transmits, to one or more other communication devices 120, an alert indicating one or more of the removal of the one or more BWOs 106 and the severity level. Indeed, it is generally understood that the controller 218, and/or the communication device 200 has access to network addresses of the other communication devices 120 so that the alerts may be transmitted. Such addresses may be preconfigured at the memory 220 for example, and/or downloaded from a cloud device that maintains such network addresses.

At a block 310, the controller 218, and/or the communication device 200, controls the transmitting of the alert based on the severity level.

Indeed, the blocks 308, 310 may be performed in conjunction with, for example, the controller 218, and/or the communication device 200 determining how to control the transmitting of the alert based on the severity level before transmitting the alert.

For example, controlling the transmitting of the alert based on the severity level may comprise: selecting a larger number of the one or more other communication devices 120 to which the alert is transmitted based on a value of the severity level being above a threshold value.

For example, again referring to Table I, if the first responder 102 were to carry all the BWOs 106 on the list, and all were removed by the first responder 102, the total severity level would be "86" (e.g., all the severity levels of the second column added together). In such an example, a threshold value may of "9" may be selected, such that if at least the gun 112, having an associated severity level of "10", were removed by the first responder 102, the alert would be transmitted to a larger number of the other communication devices 120 than if the total severity level were "9" or lower. However, other examples are within the scope of the present application, and indeed more than one threshold value may be used, such as threshold values of "2", "9" and "20", in which the alert is transmitted to increasing numbers of the other communication devices 120 as the total severity level increases above the various threshold values. Indeed, in some examples for total severity levels below the lowest threshold value of "2" (e.g., only a whistle is removed), no alert may be transmitted.

In contrast, for a total severity level between the lowest threshold value of "2", and the second lowest threshold value of "9", the alert may be transmitted to only other communication devices 120 that are within the same patrol area of the first responder 102. Such examples assume that the communication device 200 has access to a list of such communication devices 120 that are within the same patrol area of the first responder 102, which may include, but is not limited to, a list (and associated network addresses used to transmit the alert) of such other communication devices 120, which may be provisioned at the communication device 200 and/or accessed, and/or periodically accessed and updated, by communication with a cloud device (not depicted) that provides and/or maintains such a list.

In further contrast, for a total severity level above the highest threshold value of "20" the alert may be transmitted to other communication devices 120 that are associated with first responders and/or a first responder agency, such as the other communication devices 120-1, 120-2, 120-3, 120-4, 120-5, and the communication device 120-6 (e.g., the civilian cell phone) may be excluded from such receiving the alert.

However, the specific other communication devices 120 to which to send the alert may further depend on which of the BWOs 106 are removed. For example, when the BWOs 106 that are removed include the access card 114, which may unlock a building that a user of the communication device 120-6 is managing, the alert may be provided to the communication device 120-6 regardless of the severity level, though the alert to the communication device 120-6 may be customized for the communication device 120-6, for example, to indicate that the access card 114 may have been stolen, but without necessarily including the circumstances under which the access card 114 was removed, the audio or video received at the block 302, or an indication of other BWOs 106 that were removed.

Indeed, an alert to the other communication devices 120-1, 120-2, 120-3, 120-4, 120-5 associated with first responders may be similarly customized, and may indicate that the first responder 102 has removed various BWOs 106 and that the first responder 102 is being held at gunpoint. Such an alert to the other communication devices 120-1, 120-2, 120-3, 120-4, 120-5 may include at least a portion of one or more of audio and the images, received at the block 302. Furthermore, such an alert to the other communication devices 120-1, 120-2, 120-3, 120-4, 120-5 associated with first responders may include a list of BWOs 106 that have been removed, as determined using the audio and/or images from the microphone 122 and/or the camera 124.

Alternatively, or in addition, controlling the transmitting of the alert based on the severity level may comprise: increasing a range within which the one or more other communication devices 120 to which the alert is transmitted based on a value of the severity level being above a threshold value. Such examples assume that the communication device 200 has access to a list of communication devices 120 and their current location, which may include, but is not limited to, a list (and associated network addresses used to transmit the alert) of such other communication devices 120, which may be provisioned at the communication device 200 and/or accessed, and/or periodically accessed and updated, by communication with a cloud device (not depicted) that provides and/or maintains such a list. Indeed, in this example, it is understood that the various communication devices 120 may periodically provide their location (e.g., determined using respective location determining devices, such as Global Positioning System (GPS) devices) to such a cloud device.

For example, returning to the example of the three threshold values of "2", "9" and "20", when the severity level is below "2", the alert may be transmitted to other communication devices 120 within 20 meters; when the severity level is between "2", and the second lowest threshold value of "9", the alert may be transmitted to other communication devices 120 within 1 km; and when the severity level is above "20", the alert may be transmitted to other communication devices 120 within 5 kms.

Alternatively, or in addition, controlling the transmitting of the alert based on the severity level may comprise: selecting different types of the one or more other communication devices 120 to which the alert is transmitted based on a value of the severity level.

For example, returning to the example of the three threshold values of "2", "9" and "20", when the severity level is below "2", the alert may not be transmitted to other communication devices 120; when the severity level is between "2", and the second lowest threshold value of "9", the alert may be transmitted to other communication devices 120 that are first responder radios (e.g., the communication devices 120-1, 120-2, 120-3, 120-4); and when the severity level is above "20", the alert may be transmitted to other communication devices 120 that are first responder radios and dispatch terminals (e.g., the communication device 120-5).

Indeed, in some examples, the different types of other communication devices 120 may include, but are not limited to, public safety communication devices (e.g., such as the communication devices 120-1, 120-2, 120-3, 120-4, 120-5), enterprise communication devices (e.g., similar to the radios of the communication devices 120-1, 120-2, 120-3, 120-4 or the civilian cell phone of the communication device 120-6, but operated by a security guard), and consumer and/or civilian communication devices, such as the communication device 120-6. Such an example assumes that the communication device 200 has access to a preconfigured list of the other communication devices 200 and their respective types (e.g., and network addresses).

Hence, again returning to the example of the three threshold values of "2", "9" and "20", when the severity level is below "2", the alert may be transmitted to enterprise (e.g., security guard operated) communication devices that may also be within a given range); when the severity level is between "2", and the second lowest threshold value of "9", the alert may be transmitted to public safety communication devices; and when the severity level is above "20", the alert may be transmitted to both enterprise communication devices and public safety communication devices. Indeed, in any of these examples, the alert may be transmitted to consumer and/or civilian communication devices, depending on the severity level, though, in some examples, only when a removed BWO 106 includes the access card 114, and the like.

Alternatively, or in addition, controlling the transmitting of the alert based on the severity level may comprise: selecting different transceivers 208 used to transmit the alert to the one or more other communication devices 120 based on a value of the severity level.

Again returning to the example of the three threshold values of "2", "9" and "20", when the severity level is below "2", the alert may be transmitted to using a Bluetooth™ transceiver and/or a WiFi transceiver, for example to transmit the alert to other communication devices 120 that are nearby and/or within a range of such a Bluetooth™ transceiver and/or a WiFi transceiver; when the severity level is between "2", and the second lowest threshold value of "9", the alert may be transmitted using a DMR and/or P25 and/or TETRA transceiver (e.g., to transmit to public safety communication devices); and when the severity level is above "20", the alert may be transmitted using a combination a DMR and/or P25 and/or TETRA transceivers and 5G transceiver (e.g., to transmit to public safety communication devices and enterprise communication devices).

Similarly, it is understood that the other communication devices 120 may have different types of transceivers that may operate using different protocols. For example, DMR and/or P25 and/or TETRA transceivers of the other communication devices 120-1, 120-2, 120-3, 120-4, 120-5 may include transceivers 208 suitable for communication using talkgroups, and hence alerts may be transmitted on such talkgroups (e.g., on a talkgroup dedicated to emergencies), for example as audio, text and/or images.

However, the other communication device 120-6 may comprise a civilian cell phone that excludes transceivers 208 suitable for communication using talkgroups, but may include a 5G transceiver suitable for receiving alerts, as audio, text and/or images, using short message service (SMS) messages and/or multimedia messaging service (MMS) messages and/or cell phone calls.

Hence, a type of respective alert that is transmitted, and/or how a respective alert is transmitted, may depend on types of available transceivers 208 at the various other communication devices 120.

Indeed, some examples heretofore further illustrate that choosing a transceiver 208 to send an alert (e.g., WiFi and Bluetooth vs., DMR, P25, TETRA and 5G) may also affect a range over which the alert is transmitted and/or a type of communication device to which the alert is transmitted.

Alternatively, or in addition, controlling the transmitting of the alert based on the severity level may comprise: increasing a transmission range of a transceiver 208 used to transmit the alert to the one or more other communication devices 120 based on a value of the severity level being above a threshold value.

Again returning to the example of the three threshold values of "2", "9" and "20", when the severity level is below "2", the alert may be transmitted to using a Bluetooth™ transceiver and/or a WiFi transceiver at a first energy level, for example to transmit the alert to other communication devices 120 that are nearby and/or within a first range of such a Bluetooth™ transceiver and/or a WiFi transceiver when operated at the first energy level; when the severity level is between "2", and the second lowest threshold value of "9", the alert may be transmitted to using a Bluetooth™ transceiver and/or a WiFi transceiver at a second energy level, higher than the first energy level, for example to transmit the alert to other communication devices 120 that within a second range of such a Bluetooth™ transceiver and/or a WiFi transceiver, that is larger than the first range, when operated at the second energy level; and when the severity level is above "20", the alert may be transmitted to using a Bluetooth™ transceiver and/or a WiFi transceiver at a third energy level, higher than the second energy level, for example to transmit the alert to other communication devices 120 that are within a third range of such a Bluetooth™ transceiver and/or a WiFi transceiver, that is larger than the second range, when operated at the second energy level.

Put another way, an energy level of any suitable transceiver 208 may be increased as the severity level increases to increase a transmission range over which the alert is transmitted, for example to transmit the alert to increasing numbers of the other communication devices 120.

The method 300 may include any other suitable features. For example, the method 300 may further comprise the controller 218, and/or the communication device 200, controlling the BWC 110, or any other suitable BWO 106, such as the communication device 108, into a recording mode, and/or covert recording mode, in which audio and/or video is recorded covertly (e.g., any lights and/or indicators that indicate recording is occurring may be turned off and/or left off). Such control of the BWC 110, and the like, may occur by way of a command to the BWC 110, and the like. Such control may depend on the severity level being above an aforementioned threshold value.

Alternatively, or in addition, the method 300 may further comprise the controller 218, and/or the communication device 200, controlling the BWC 110, or any other suitable BWO 106, such as the communication device 108, into a streaming mode in which audio and/or video is streamed to any suitable other communication device 120, such as the dispatch terminal of the communication device 120-5. Hence, a dispatcher may dispatch other first responders to the first responder 102 accordingly. Such control may depend on the severity level being above an aforementioned threshold value.

Alternatively, or in addition, the method 300 may further comprise the controller 218, and/or the communication device 200, customizing alerts to the other communication devices 120 depending a type of the other communication devices 120, and the like. For example, an alert to an enterprise communication device and/or a civilian communication device may include instructions to evacuate an associated building to which the access card 114 provides access, while an alert to public safety communication devices may include a request for backup.

Alternatively, or in addition, the method 300 may further comprise the controller 218, and/or the communication device 200, transmitting commands to one or more access control devices (not depicted, but which may include, and is not limited to, electrically controlled doors, and the like), such as an access control device of a building to which the access card 114 provides access, for example to lock and/or not respond to the access card 114 in the event the POI 104 attempts to gain access to the building using the access card 114. Such transmitting of commands may depend on the severity level being above an aforementioned threshold value.

Alternatively, or in addition, the method 300 may further comprise the controller 218, and/or the communication device 200, transmitting commands to traffic lights (not depicted), such as traffic lights proximal to the first responder 102, for example to control traffic away from the POI 104, who may be dangerous. Such transmitting of commands may depend on the severity level being above an aforementioned threshold value.

Alternatively, or in addition, the method 300 may further comprise the controller 218, and/or the communication device 200, transmitting commands to pan-tilt-zoom (PTZ) commands to PTZ cameras (not depicted) proximal to the first responder 102 (and which may be different from the camera 124), to better acquire images of the first responder 102 and the POI 104. Such transmitting of commands may depend on the severity level being above an aforementioned threshold value.

Each of the above examples assume that the communication device 200 has been preconfigured with, and/or has access to, network addresses of the other communication devices 120 and/or the access points and/or the traffic lights and/or the PTZ cameras, and the like.

Figure 4:
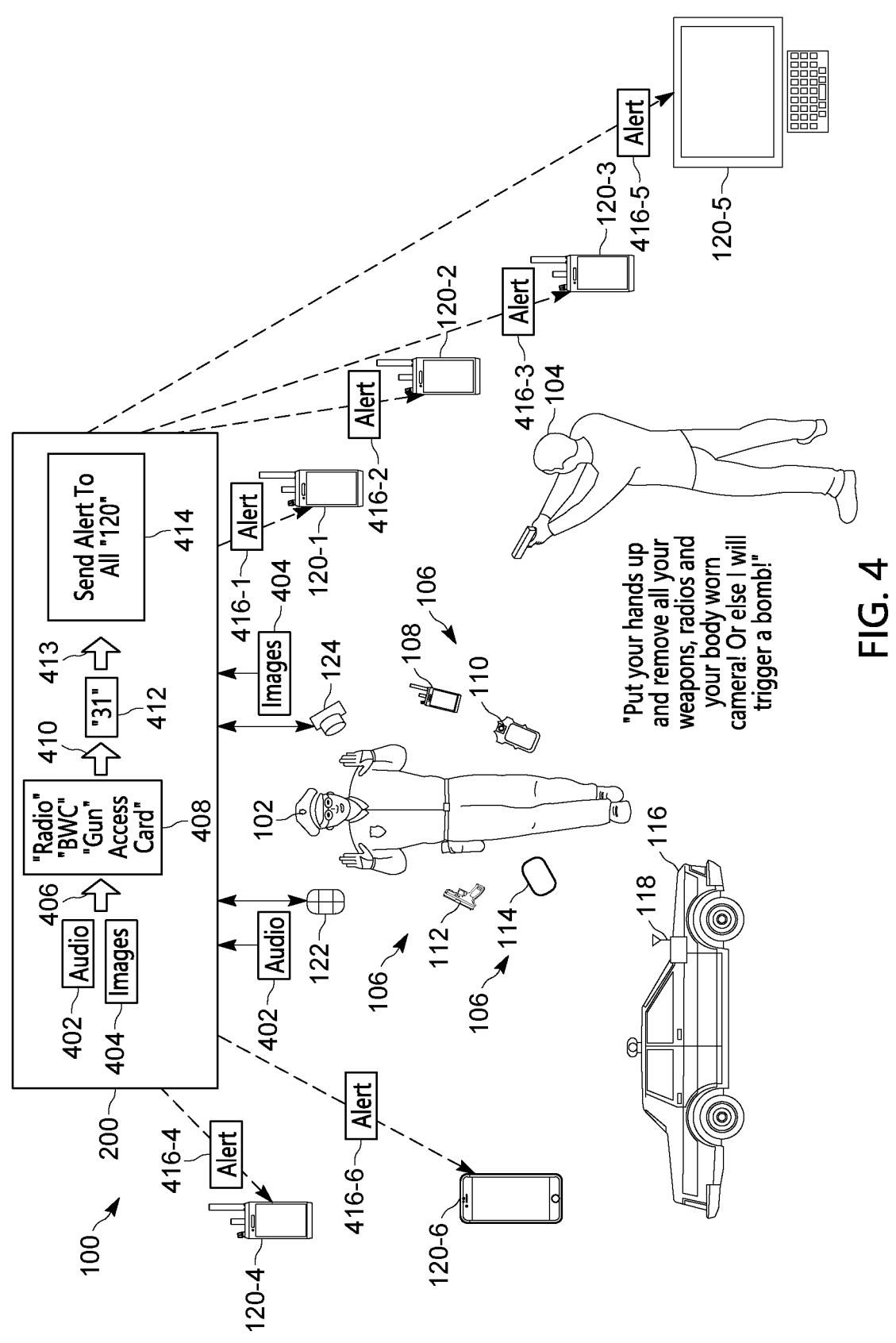
FIG. 4 depicts the system of FIG. 1 implementing a method for controlling alert transmission, in accordance with some examples.
Figure 5:
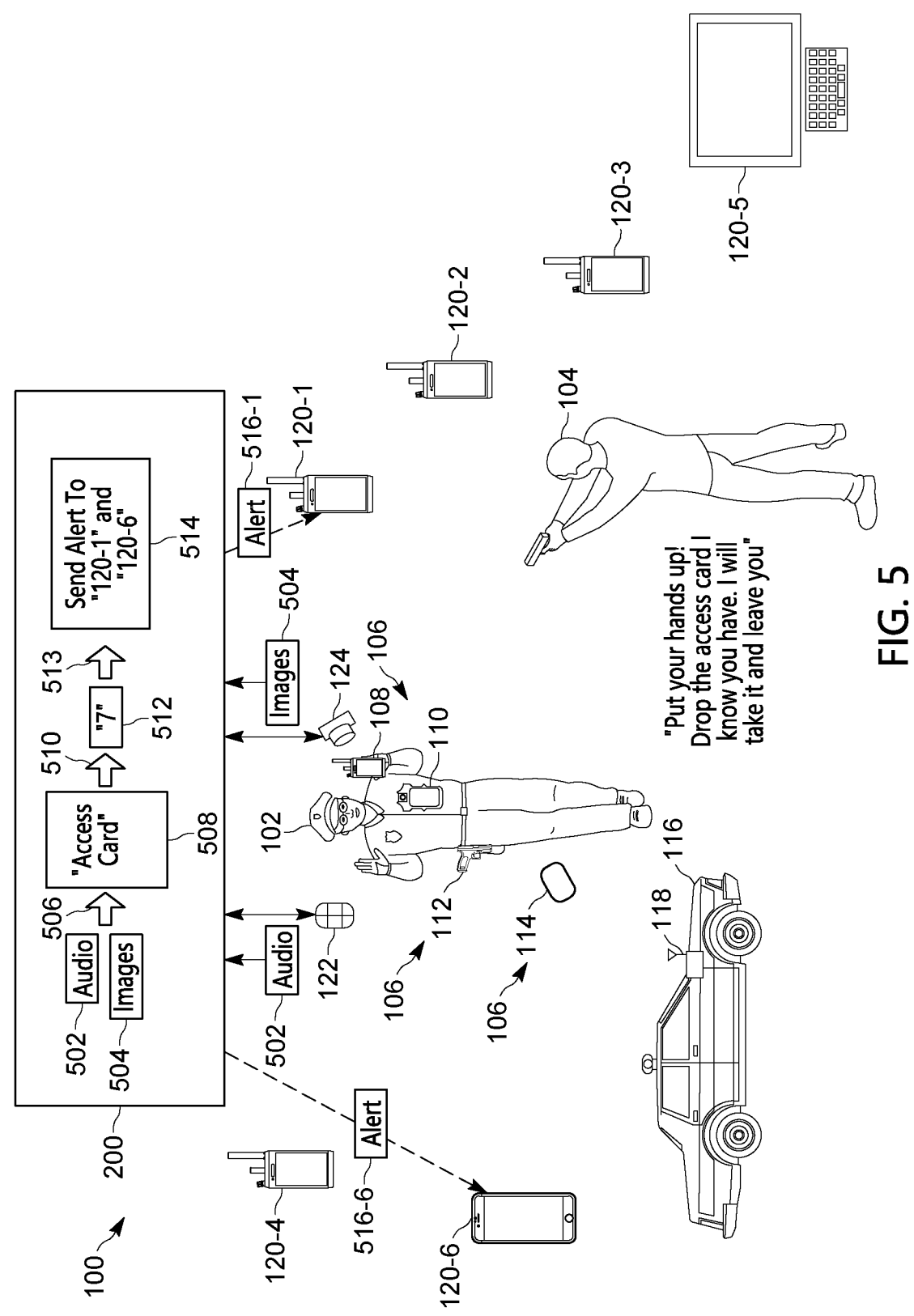
FIG. 5 depicts the system of FIG. 1 implementing a method for controlling alert transmission, in accordance with other examples.

An example of the method 300 is next described with respect to FIG. 4 and FIG. 5, which are substantially similar to FIG. 1, with like components having like numbers. However, in FIG. 4 and FIG. 5, the communication device 200 is depicted as another component of the system 100, though it is understood that the communication device 200 may comprise the communication device 108 and/or the communication device 118 and/or a cloud computing device. Furthermore, in FIG. 4 and FIG. 5, communication links between the communication device 200 and the microphone 122 and the camera 124 are depicted as double ended arrows. For simplicity, wireless communications between the communication device 200 and the other communication devices 120 are depicted with arrows using dashed lines.

Attention is first directed to FIG. 4, which depicts the communication device 200 receiving (e.g., at the block 302 of the method 300) audio 402 and images 404, respectively, from the microphone 122 and the camera 124. The communication device 200 analyzes (e.g., at the block 304 of the method 300, as represented by an arrow 406) the audio 402 and the images 404 to determine that the first responder 102 has removed one or more BWOs 106 as demanded by the POI 104. As depicted, the analysis results in a list 408 of BWOs 106 that were removed. For example, the list 408 indicates that the radio (e.g., the communication device 108), the BWC 110, the gun 112 and the access card 114 were removed.

From the list 408, the communication device 200 determines (e.g., at the block 306 of the method 300, as represented by an arrow 410) that a severity level 412 of the removal of the BWOs 106. As depicted, the severity level 412 has been determined to be "31" (e.g., as described herein with respect to Table I).

From the severity level 412, the communication device 200 determines (represented by an arrow 413) a command 414 to control transmitting an alert of the severity level 412. For example, as described herein, the communication device 200 may determine that a value of the severity level 412 of "31" is greater than a threshold value of "20" and determines that the alert is to be transmitted to all the other communication devices 120, including the other communication device 120-6 as the BWOs 106 that are removed by the first responder 102 include the access card 114.

Hence, the communication device 200 transmits (e.g., at the block 308 of the method 300) respective alerts 416-1, 416-2, 416-3, 416-4, 416-5, 416-6 (e.g., the alerts 416 and/or an alert 416) to the other communication devices 120. It is furthermore understood that the communication device 200 controls (e.g., at the block 310 of the method 300) transmitting of the alerts based on value of the severity level 412 being above the threshold value of "20".

To further illustrate such control of the transmitting of an alert, attention is next directed to FIG. 5, which is substantially similar to FIG. 4, but depicts another scenario in which the POI 104 demands that the first responder 102 remove only the access card 114, for example by demanding the first responder 102 "Put your hands up! Drop the access card I know you have. I will take it and leave you." In this example, first responder 102 has removed only the access card 114, and hence only the access card 114 is a BWO 106 removed by the first responder 102. In contrast to FIG. 1 and FIG. 4, the communication device 108, the BWC 110, and the gun 112 are not BWOs 106 removed by the first responder 102, but continue to be BWOs 106 in general as the first responder 102 continues to wear and/or hold the communication device 108, the BWC 110, and the gun 112; indeed, this example illustrates that a BWO 106 may not be strictly "worn" by the first responder 102 all the time, but may be held by the first responder 102 at least some of the time.

In this example, the communication device 200 receives (e.g., at the block 302 of the method 300) audio 502 and images 504, respectively, from the microphone 122 and the camera 124. The communication device 200 analyzes (e.g., at the block 304 of the method 300, as represented by an arrow 506) the audio 502 and the images 504 to determine that the first responder 102 has removed one or more BWOs 106 as demanded by the POI 104. As depicted, the analysis results in a list 508 of BWOs 106 that were removed. For example, the list 508 indicates that the only the access card 114 was removed.

From the list 508, the communication device 200 determines (e.g., at the block 306 of the method 300, as represented by an arrow 510) that a severity level 512 of the removal of the BWOs 106. As depicted, the severity level 512 has been determined to be "7" (e.g., in Table I, the access card 114 is associated with a severity level of "7").

From the severity level 512, the communication device 200 determines (represented by an arrow 513) a command 514 to control transmitting an alert of the severity level 512.

For example, as described herein, the communication device 200 may determine that a value of the severity level 512 of "7" is between threshold values of "2" and "9", and determines that the alert is to be transmitted only to the other communication devices 120-1, 120-6. For example, the other communication device 120-1 may be selected based on location (e.g., the other communication device 120-1 may be within a given distance of the first responder 102 and/or in same patrol area), and the other communication device 120-6 may be selected as the BWO 106 that is removed by the first responder 102 includes the access card 114.

Hence, the communication device 200 transmits (e.g., at the block 308 of the method 300) respective alerts 516-1, 516-6 (e.g., the alerts 516 and/or an alert 516) to the other communication devices 120-1, 120-6. It is furthermore understood that the communication device 200 controls (e.g., at the block 310 of the method 300) transmitting of the alerts based on value of the severity level 512 being between the threshold values of "2" and "9".

Indeed, depending on the location of the other communication devices 120-1, 120-6, in the example of FIG. 5, the communication device 200 may select an appropriate transceiver 208 for transmitting the alerts 516, and/or control a transmission range of such a transceiver 208 as described herein.

With further attention directed to FIG. 5, after the first responder 102 has removed the access card 114, the POI 104 may further demand that the first responder 102 remove other BWOs 106, such as the communication device 108, the BWC 110 and/or the gun 112, and the method 300 may be repeated with the severity level 512 updated accordingly. In particular, the severity level 512 may increase to "31" as in FIG. 4, and alerts similar to the alerts 416 of FIG. 4 may be transmitted, with updated indications of the BWOs 106 that were removed. Put another way, at least the blocks 302, 304, 306 of the method 300 may be repeated after the alerts 516 are transmitted, and when the severity level 512 changes further alerts 516 may be transmitted, with updated information, and controlled according to the changed severity level 512. However, in some instances, one or more further alerts 516 may not be transmitted to other communication devices 120 that have already received a previous alert 516; for example, a further alert 516 to the communication device 120-6 may not be transmitted as a civilian cell phone may not be alerted to anything other than the access card 114 being removed.

It is furthermore understood that, in some examples, when the severity level 512 is below a lowest threshold value, the method 300 may pause for a given time period, such as 10 seconds, 30 seconds, 1 minute, amongst other possibilities, between the block 306 and the block 308 and continue analyzing the audio 502 and/or the images 504 in the event more BWOs 106 are removed, and again determine the severity level 512. Put another way, at least the blocks 302, 304, 306 may be repeated for a given time period and/or until the severity level 512 stops changing (e.g., and/or doesn't change), and the blocks 308, 310 may be implemented after the given time period and/or after the severity level 512 stops changing (and/or doesn't change).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot control transmission of data, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/ or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions and/or program code (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions and/or program code, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a communication device communicatively coupled to one or more of a microphone and a camera, one or more of audio and images associated with a first responder;
analyzing, at the communication device, one or more of the audio and the images to determine that the first responder has removed one or more body worn objects (BWOs) as demanded by a person-of-interest (POI);
determining, at the communication device, a severity level of removal of the one or more BWOs;
transmitting, from the communication device, to one or more other communication devices, an alert indicating one or more of the removal of the one or more BWOs and the severity level; and
controlling, at the communication device, the transmitting of the alert based on the severity level.

2. The method of claim 1, wherein controlling the transmitting of the alert based on the severity level comprises:
selecting a larger number of the one or more other communication devices to which the alert is transmitted based on a value of the severity level being above a threshold value.

3. The method of claim 1, wherein controlling the transmitting of the alert based on the severity level comprises:

increasing a range within which the one or more other communication devices to which the alert is transmitted based on a value of the severity level being above a threshold value.

4. The method of claim 1, wherein controlling the transmitting of the alert based on the severity level comprises:

selecting different types of the one or more other communication devices to which the alert is transmitted based on a value of the severity level.

5. The method of claim 1, wherein controlling the transmitting of the alert based on the severity level comprises:

selecting different transceivers used to transmit the alert to the one or more other communication devices based on a value of the severity level.

6. The method of claim 1, wherein controlling the transmitting of the alert based on the severity level comprises:

increasing a transmission range of a transceiver used to transmit the alert to the one or more other communication devices based on a value of the severity level being above a threshold value.

7. The method of claim 1, wherein determining the severity level of the removal of the one or more BWOs comprises:

accessing, at a memory, a list of respective severity levels assigned to each of the one or more BWOs; and when a number of the one or more BWOs that are removed is two or more, combining the respective severity levels of the two or more BWOs that are removed to generate the severity level.

8. The method of claim 7, further comprising:

monitoring the number of the one or more BWOs that are removed via one or more of the audio and the images; and as the number of the one or more BWOs that are removed increases, increasing the severity level.

9. The method of claim 1, wherein in the communication device comprises one or more of the BWOs.

10. The method of claim 1, wherein the communication device comprises a device proximal to the first responder.

11. A communication device comprising:

a controller communicatively coupled to one or more of a microphone and a camera; and a computer-readable storage medium having stored thereon program instructions that, when executed by the controller, causes the controller to perform a set of operations comprising:

receiving one or more of audio and images associated with a first responder;

analyzing one or more of the audio and the images to determine that the first responder has removed one or more body worn objects (BWOs) as demanded by a person-of-interest (POI);

determining a severity level of removal of the one or more BWOs;

transmitting, from the communication device, to one or more other communication devices, an alert indicating one or more of the removal of the one or more BWOs and the severity level; and controlling the transmitting of the alert based on the severity level.

12. The communication device of claim 11, wherein controlling the transmitting of the alert based on the severity level comprises:

selecting a larger number of the one or more other communication devices to which the alert is transmitted based on a value of the severity level being above a threshold value.

13. The communication device of claim 11, wherein controlling the transmitting of the alert based on the severity level comprises:

increasing a range within which the one or more other communication devices to which the alert is transmitted based on a value of the severity level being above a threshold value.

14. The communication device of claim 11, wherein controlling the transmitting of the alert based on the severity level comprises:

selecting different types of the one or more other communication devices to which the alert is transmitted based on a value of the severity level.

15. The communication device of claim 11, wherein controlling the transmitting of the alert based on the severity level comprises:

selecting different transceivers used to transmit the alert to the one or more other communication devices based on a value of the severity level.

16. The communication device of claim 11, wherein controlling the transmitting of the alert based on the severity level comprises:

increasing a transmission range of a transceiver used to transmit the alert to the one or more other communication devices based on a value of the severity level being above a threshold value.

17. The communication device of claim 11, wherein determining the severity level of the removal of the one or more BWOs comprises:

accessing, at a memory, a list of respective severity levels assigned to each of the one or more BWOs; and when a number of the one or more BWOs that are removed is two or more, combining the respective severity levels of the two or more BWOs that are removed to generate the severity level.

18. The communication device of claim 17, wherein the set of instructions further comprises:

monitoring the number of the one or more BWOs that are removed via one or more of the audio and the images; and as the number of the one or more BWOs that are removed increases, increasing the severity level.

19. The communication device of claim 11, wherein in the communication device comprises one or more of the BWOs.

20. The communication device of claim 11, wherein the communication device comprises a device proximal to the first responder.

* * * * *